(12) United States Patent
Arai et al.

(10) Patent No.: US 7,325,780 B2
(45) Date of Patent: Feb. 5, 2008

(54) MOTOR OPERATED VALVE WITH REDUCTION GEAR

(75) Inventors: Yusuke Arai, Tokyo (JP); Eiichi Sasada, Tokyo (JP); Tomoari Ouchi, Tokyo (JP); Hitoshi Umezawa, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 11/298,048

(22) Filed: Dec. 9, 2005

(65) Prior Publication Data

US 2006/0180780 A1    Aug. 17, 2006

(30) Foreign Application Priority Data

Feb. 16, 2005    (JP)    ............ 2005-039446

(51) Int. Cl.
*F16K 31/04*    (2006.01)
(52) U.S. Cl. ............ 251/65; 251/129.11; 251/335.2
(58) Field of Classification Search ...............
251/129.11–129.13, 335.3, 65
See application file for complete search history.

(56) References Cited

U.S. PATENT DOCUMENTS

| | | | | |
|---|---|---|---|---|
| 3,908,959 | A * | 9/1975 | Fichtner ............ | 251/129.11 |
| 4,723,753 | A * | 2/1988 | Torimoto et al. ...... | 251/129.11 |
| 5,052,656 | A * | 10/1991 | Katayama ............ | 251/129.11 |
| 5,096,157 | A * | 3/1992 | Yasuda ............ | 251/129.11 |
| 5,345,835 | A | 9/1994 | Schabert et al. | |
| 5,364,066 | A * | 11/1994 | Dorste et al. ......... | 251/129.11 |
| 5,597,009 | A * | 1/1997 | Scherrer et al. ....... | 251/129.11 |
| 5,718,259 | A * | 2/1998 | Miyake et al. ......... | 251/129.11 |
| 5,749,350 | A * | 5/1998 | Bender ............ | 251/129.11 |
| 5,769,390 | A * | 6/1998 | Ando ............ | 251/129.11 |
| 6,157,103 | A * | 12/2000 | Ohta et al. ............ | 310/49 R |
| 6,279,870 | B1 * | 8/2001 | Welz et al. ............ | 251/129.12 |
| 6,405,758 | B1 * | 6/2002 | Hara ............ | 251/129.11 |
| 6,460,567 | B1 * | 10/2002 | Hansen et al. ......... | 251/129.11 |
| 6,585,228 | B1 * | 7/2003 | McCaskill ............ | 251/129.13 |
| 6,682,045 | B2 * | 1/2004 | Hashimoto ............ | 251/129.11 |
| 2004/0159809 | A1 * | 8/2004 | Noritake et al. ....... | 251/129.04 |

FOREIGN PATENT DOCUMENTS

| | | |
|---|---|---|
| EP | 0388207 | 9/1990 |
| JP | 59110976 | 6/1984 |
| JP | 2000-356278 | 12/2000 |
| JP | 2002-084732 | 3/2002 |
| JP | 2003-056735 | 2/2003 |
| JP | 2003-232465 | 8/2003 |

\* cited by examiner

*Primary Examiner*—John Bastianelli
(74) *Attorney, Agent, or Firm*—Fildes & Outland, P.C.

(57) ABSTRACT

A small-sized motor operated valve is disclosed that has high output and high resolution by housing a reduction gear together with a rotor in a single can. A valve shaft 32 having a valve member 30 is inserted to a motor operated valve body 10. A rotor 170 is disposed inside a can 100 attached to the body 10, and inside the rotor 170 is housed a reduction gear 200. The output of the rotor is input to a sun gear 220 and transmitted to planetary gears 230. The planetary gears 230 are engaged both with the fixed gear 250 and the output gear 260, and the output gear 260 is driven at reduced speed by a large reduction ratio. The output of the output gear 260 is transmitted via a driver 300 to a screw shaft 320, where it is converted into a linear movement and transmitted to the valve shaft 32.

6 Claims, 5 Drawing Sheets

(a)

(b)

(a)

(b)

US 7,325,780 B2

MOTOR OPERATED VALVE WITH REDUCTION GEAR

The present application is based on and claims priority of Japanese patent application No. 2005-39446 filed on Feb. 16, 2005, the entire contents of which are hereby incorporated by reference.

BACKGROUND OF THE INVENTION

1. Field of the Invention

The present invention relates to a motor operated valve with a reduction gear.

2. Description of the Related Art

Heretofore, there are known two main types of motor operated valves for opening and closing a valve via an electric motor. The first type opens and closes the valve by transmitting the rotation of a rotor directly to a screw mechanism, the example of which is disclosed for example in Japanese Patent Application Laid-Open Publication No. 2000-356278 (patent document 1). The second type is equipped with a reduction gear that reduces the rotation of the rotor via a reduction gear before transmitting the same to the screw mechanism, the examples of which are disclosed in Japanese Patent Application Laid-Open Publication No. 2002-84732 (patent document 2) and Japanese Patent Application Laid-Open Publication No. 2003-232465 (patent document 3).

The first type of motor operated valves is relatively compact, but the valve can be only used when the load is small, and it is difficult to enhance the resolution of the valve opening per single drive pulse.

The second type of motor operated valves can be applied to the case where the load is high, and the resolution of the valve opening per single drive pulse can be enhanced, but the overall size of the motor valve is large since the gear box for the reduction gear is disposed separately from the motor.

SUMMARY OF THE INVENTION

Therefore, the present invention aims at providing a motor operated valve with a reduction gear that is compact in size and capable of exerting enhanced valve operation ability and high-resolution valve opening performance, by having a reduction gear together with a rotor housed inside a single can.

In order to achieve the above-mentioned object, the present invention provides a motor operated valve with a reduction gear comprising a valve body having a valve chamber and a valve seat, a valve member disposed movably in the valve chamber to open and close an opening of the valve seat, a valve shaft for operating the valve member, a cylindrical can fixed to the valve body, a motor exciter mounted on an outer circumference portion of the can, a permanent magnet-type rotor rotatably supported at an inner circumference portion of the can and driven to rotate by the exciter, a reduction gear for reducing the rotation of the rotor, and a screw mechanism for moving the valve member toward and away from the valve seat via the reduction gear by the rotary movement of the rotor, wherein the reduction gear is disposed together with the rotor in a space defined by the valve body and the can.

The reduction gear is preferably disposed inside the rotor.

However, the reduction gear can be disposed under the rotor.

More preferably, the reduction gear includes a planetary gear mechanism.

However, the reduction gear can be composed of a multistage train of gears.

Even more preferably, the valve chamber includes a bellows for sealing the gap between the inner side of the can.

As described, the motor operated valve according to the present invention houses a reduction gear together with a rotor in a single can, so the present invention enables to provide a compact-sized, high-output motor operated valve with high resolution at a low cost.

DETAILED DESCRIPTION OF THE PREFERRED EMBODIMENTS

Figure 1:
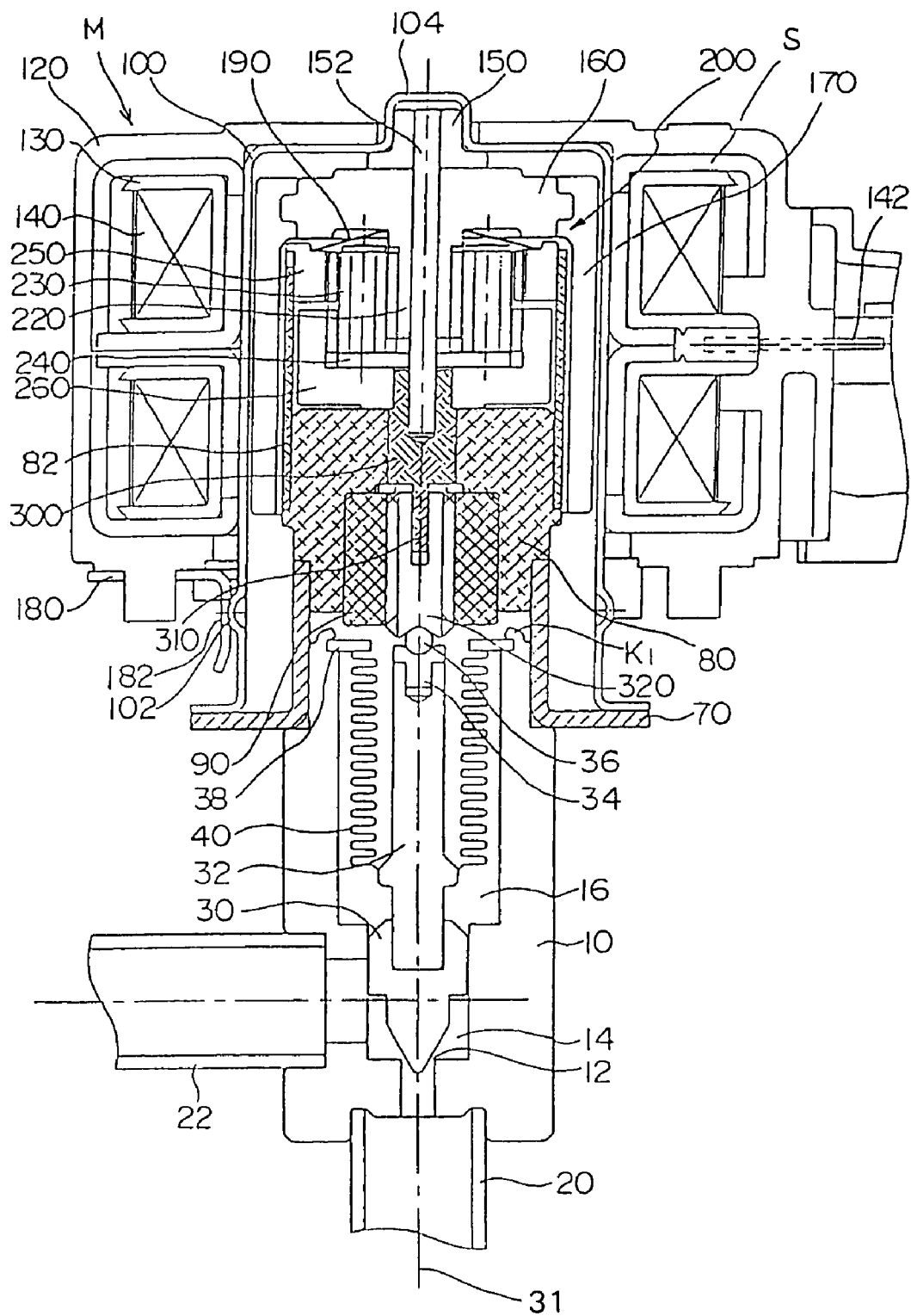
FIG. 1 is an explanatory view showing the structure of a motor operated valve according to the present invention.
Figure 2:
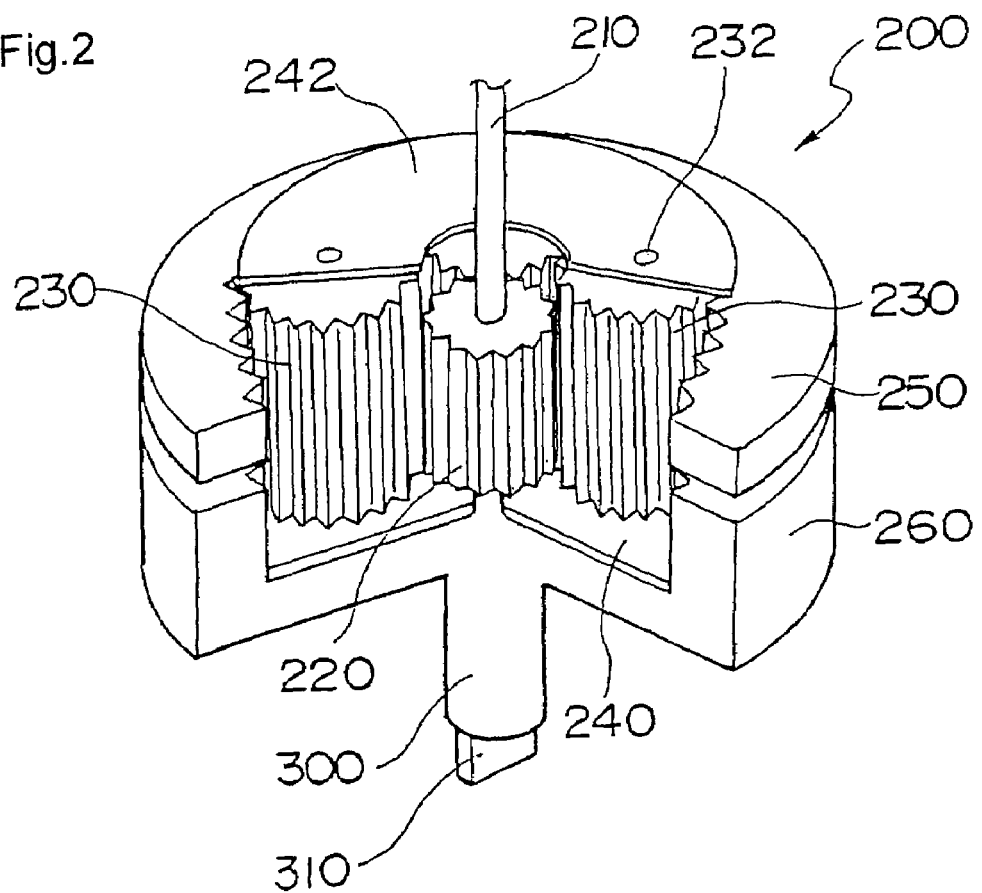
FIG. 2 is an explanatory view of a reduction gear mounted to the motor operated valve according to the present invention.
Figure 3:
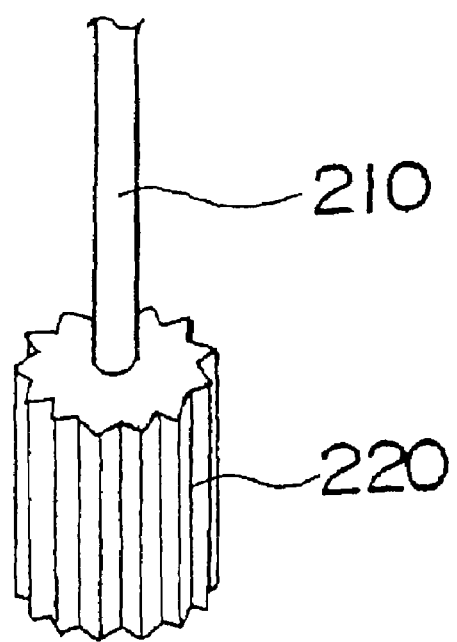
FIG. 3 is an explanatory view showing the components of the reduction gear.

As illustrated in FIG. 1, the motor operated valve according to the present invention comprises a valve body 10 having a valve seat 12 and a valve chamber 14. A valve member 30 is disposed inside the valve chamber 14. The valve member 30 is moved along a longitudinal central axis 31 toward and away from the valve seat 12. Two pipes 20 and 22 communicated with the valve chamber 14 are attached to the valve body 10.

A valve shaft 32 is connected to the valve main body 30. A ring member 38 is mounted on an opening portion formed to the upper portion of the valve body 10, and in the present embodiment, for example, it is fixed to the body via a crimping portion $K_1$. The fixing of the ring member 38 can be performed by soldering, by which the member is sealed to the body. A bellows 40 is disposed between the ring member 38 and the valve shaft 32, which provides a seal to prevent refrigerant from entering the valve. A receive member 34 of a ball 36 is inserted and fixed to the upper end portion of the valve shaft 32.

A screw shaft 320 is in contact with the upper portion of the ball 36, which conducts a thrust generated via a screw mechanism in the axial direction to the valve shaft 32 centered on the longitudinal axis 31 with other moving portions of the valve.

A flange member 70 constituting a part of the valve body is fixed via welding or the like to the outer circumference on the upper end of the valve body 10, which keeps out the outer air and prevents gas and moisture from entering the valve. On the upper portion of the flange member 70 is fixed a receive member 80. A cylindrical member 82 is attached to the outer circumference of the receive member 80, and a female screw member 90 is mounted to the inner circumference of the receive member 80.

On the other hand, a cylindrical can 100 formed of a nonmagnetic metal called a can is fixed via welding or the like to the upper portion of the flange member 70. On the outer side of the can 100 is mounted an exciter M for a stepping motor, which is one example of a driving motor.

The exciter M comprises a resin mold 120, a coil 140 wound around a bobbin 130 disposed therein, and a stator S being excited when power is fed to the coil, wherein power is fed to the coil 140 via a lead 142.

The exciter M has a mounting clasp 180 disposed on the lower portion thereof, and by engaging a hole 182 of the mounting clasp 180 to a projection 102 formed to the can 100, the exciter M can be removably attached to the can 100.

A cylindrical projection 104 is formed to the uppermost area of the can 100, and a support member 150 is press fit to the inner side of the projection 104. The support member 150 supports a fixing shaft 152.

A permanent magnet-type motor 170 for the stepping motor is disposed in a rotatable manner inside the can 100. The rotor 170 is a cylindrically shaped member formed by permanent magnet material, and is integrally formed with a rotary member 160 made of resin or the like. The turning force of the rotary member 160 is transmitted to a reduction gear denoted as a whole by reference numeral 200. The reduction gear 200 and the rotor 170 are disposed together in the can and are centered on and rotatable about the longitudinal axis 31 to form a compact coaxial motor operated valve.

FIGS. 2 through 5 are explanatory views of a reduction gear 200 assembled in the rotor.

According to the present embodiment, the reduction gear 200 exerts a large reduction ratio by utilizing a planetary gear mechanism.

The reduction gear 200 has a sun gear 220 formed integrally with a rotary member 160 disposed integrally with the rotor 170 shown in FIG. 1. The sun gear 220 is engaged with planetary gears 230, and the planetary gears 230 are supported by a carrier.

According to the present gear, the carrier is composed of a pair of disks 240 and 242 and a shaft 232 connecting the two disks 240 and 242, and the three planetary gears 230 are attached in rotatable manner to the carrier.

Figure 4:
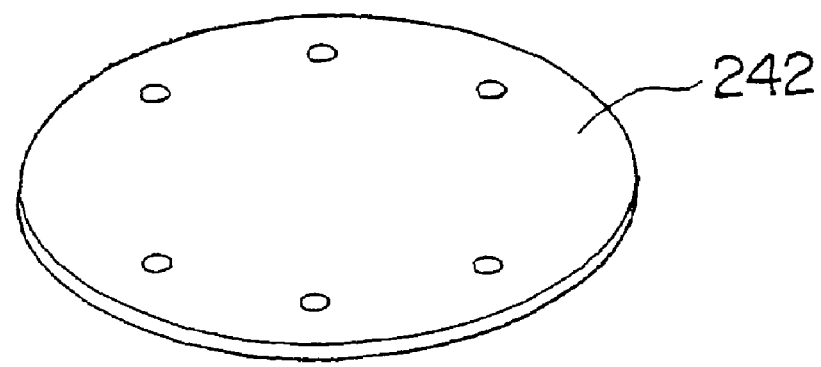
FIG. 4 is an explanatory view showing the components of the reduction gear.
Figure 4:
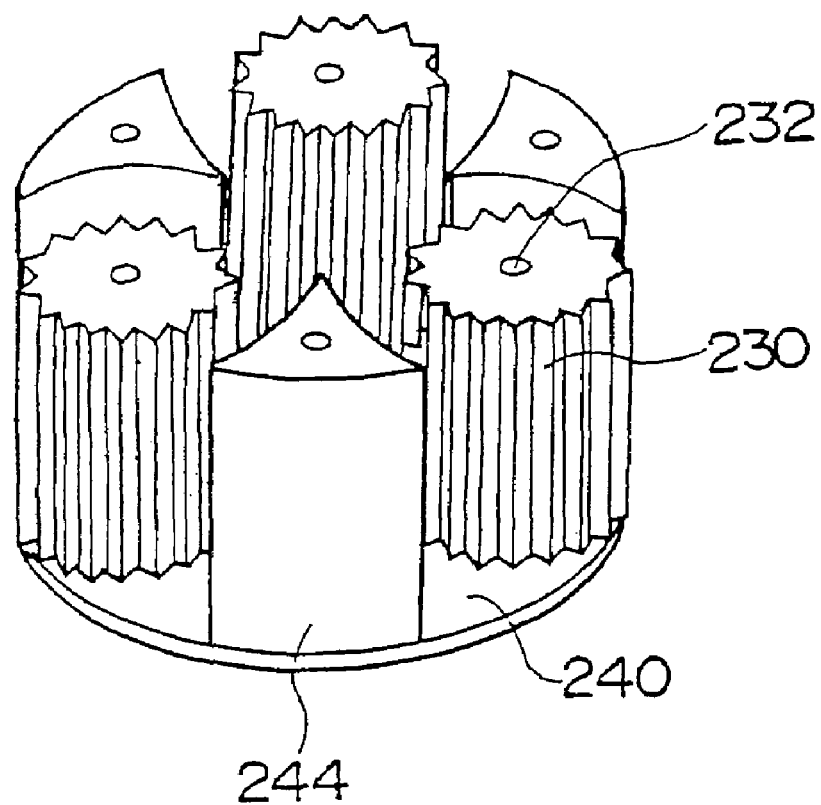
Figure 5:
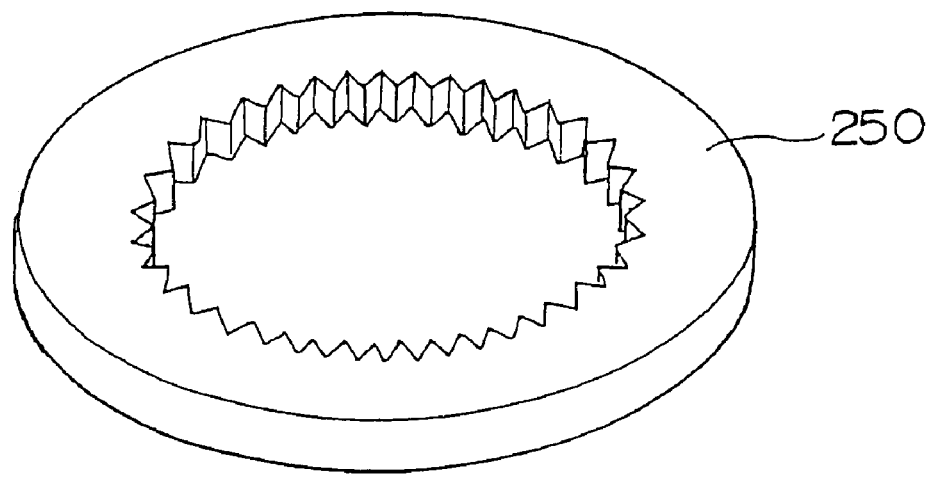
FIG. 5 is an explanatory view showing the components of the reduction gear.
Figure 5:
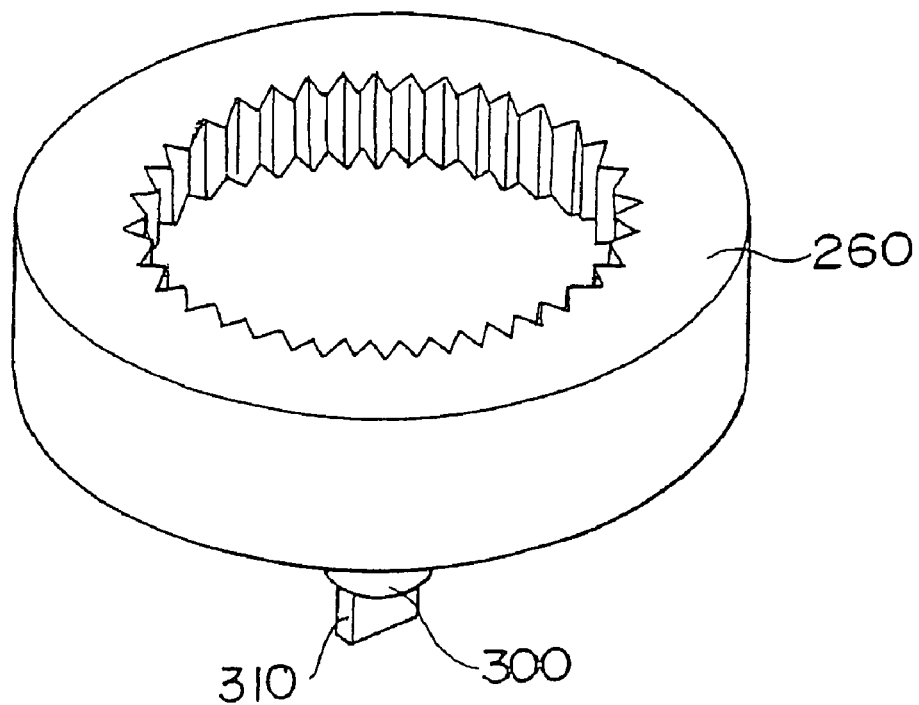

As illustrated in FIG. 4, the carrier 240 has three support pillars 244, wherein the plate 242 supports the shafts 232 of three planetary gears 230, and the plate 242 is fixed to support pillars 244 via screws and the like.

The whole body of the carrier is supported so as to rotate freely on an output gear 260 described later. The planetary gears 230 are simultaneously engaged with a ring-shaped fixed gear 250 and an output gear 260. The fixed gear 250 is fixed to the inner side of a cylindrical member 82 fixed to the valve body 10. The output gear 260 has a number of internal tooth that differs from the number of tooth on the fixed gear 250, and is supported rotatably above the receive member 80, with a driver 300 protruding downward from the bottom surface thereof.

The driver 300 has a drive unit 310 shaped like a flat-blade screwdriver, which is inserted to a screw shaft 320. The rotation of the screw shaft 320 is converted into a movement in the axial direction, which is transmitted via the ball 36 to the valve shaft 32.

A disc spring 190 is disposed between the rotary member 160 on the rotor and the fixed gear 250 on the reduction gear, by which the rotary member 160 (sun gear 220) is biased toward the support member 150.

According to this reduction gear 200, if the number of tooth on the output gear 260 is greater than the number of tooth on the fixed gear 250, the rotation of the sun gear 220 that rotates integrally with the rotor 170 in the clockwise direction (CW) causes the planetary gears 230 to rotate in the counterclockwise direction (CCW). The carrier 240 is rotated in reduced speed in the clockwise direction (CW). The output gear 260 is rotated in the clockwise direction (CW).

In contrast, if the number of tooth on the output gear 260 is smaller than the number of tooth on the fixed gear 250, the rotation of the sun gear 220 in the clockwise direction (CW) causes the output gear 260 to rotate in the counterclockwise direction (CCW).

According to the present reduction gear with a planetary gear mechanism, when the number of tooth on the sun gear 220, the planetary gear 230, the fixed gear 250 and the output gear 260 are respectively represented by Za, Zb, Zc and Zf, the output gear ratio of the output gear 260 is represented by the following formula.

$$(Z_a \cdot Z_f - Z_a \cdot Z_c)/[Z_f \cdot (Z_a + Z_c)]$$

provided that $Z_f \neq Z_c$

Incidentally, when $Z_a=12$, $Z_b=18$, $Z_c=48$ and $Z_f=54$, the output gear ratio of the output gear 260 has a reduction ratio as large as 1/45.

Since the rotation of the rotor is transmitted by a large reduction ratio to the screw shaft 320, the opening of the valve can be controlled in minute scales, in other words, by high resolution.

Since the rotor 170 and the reduction gear 200 for reducing the rotation of the rotor 170 are both sealed in a single can 100, the intrusion of outer air, moisture and the like can be prevented completely. Therefore, no condensation occurs inside the valve, and the valve can exert an accurate flow control even under severe environments.

Figure 6:
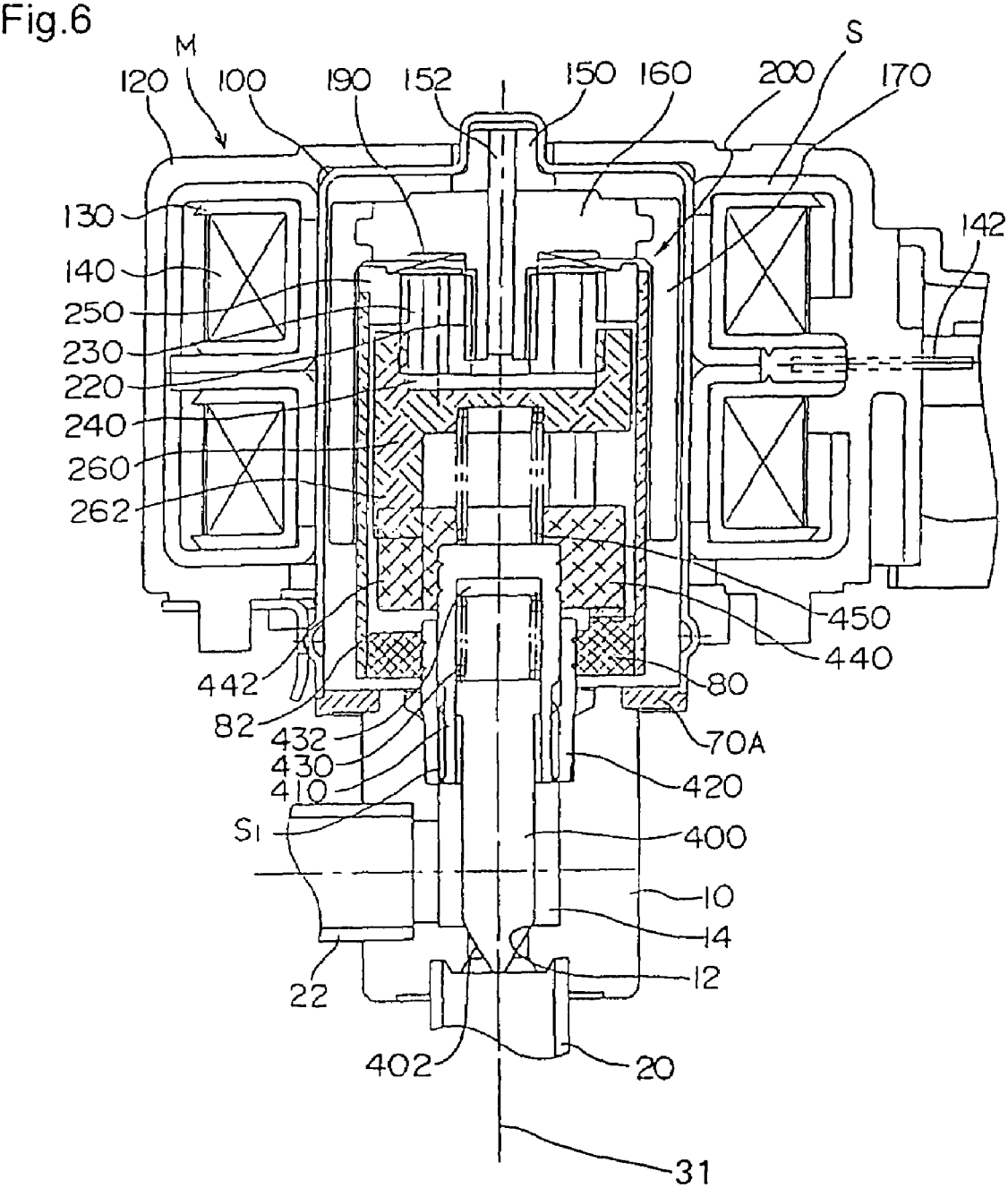
FIG. 6 is an explanatory view showing the structure of a motor operated valve according to another embodiment of the present invention.

FIG. 6 is an explanatory view showing the structure of a motor operated valve according to another embodiment of the present invention.

In the present motor operated valve, the structure of the valve body, the arrangement for removably attaching the exciter M of the stepping motor as one example of a drive motor to the outer side of the can 100 and the arrangement for assembling a reduction gear in the rotor of the stepping motor are similar to those of the motor operated valve according to the previous embodiment, so the components are denoted by the same reference numbers and detailed descriptions thereof are omitted.

According to the present motor operated valve, a flange member 70A is fixed to the upper outer side of the valve body 10, and the flange member 70A supports a can 100.

A female screw member 420 is fixed to the inner side of the upper portion of the valve body 10, and the female screw member 420 supports a cylindrical member 82 via a receive member 80.

A male screw member 410 engaged via a screw portion $S_1$ to the female screw member 420 has a valve shaft 400 slidably inserted to the inner side thereof. A valve portion 402 is formed to the leading end of the valve shaft 400, which comes into contact with a valve seat 12.

The valve shaft 400 is inserted to the male screw member 410 via a coil spring 430 and a plate 432. On the outer side of the male screw member 410 is integrally formed a drive transmission member 440 made of resin. The drive transmission member 440 has a groove 442 formed in parallel with the axis line of the male screw member.

On the other hand, an output gear 260 which is the output member of a reduction gear 200 disposed on the inner side of the rotor 170 has an arm-like drive unit 262 that extends toward the drive transmission member 440.

According to this arrangement, the turning force of the output gear 260 is transmitted to the drive transmission member 440, and thus the male screw member 410 is driven to rotate. The rotation of the male screw member 410 is converted into a movement in the axial direction by the screw portion $S_1$, by which the valve shaft 400 is moved up and down.

The rotation of the rotor 170 driven by the stepping motor is reduced by a large reduction ratio, and drives the valve shaft 400. Thus, it becomes possible to provide a motor operated valve having a large capacity and a high resolution performance at low cost by using a small stepping motor with small torque.

The embodiments described above utilizes a reduction gear having a planetary gear mechanism, but it can be replaced with a mechanical reduction gear using multistage train of gears having multiple spur gear groups.

Moreover, the embodiments described above have a reduction gear that is housed inside a rotor 170, but the reduction gear can also be disposed below the rotor.

Furthermore, the flow control performance of the valve with respect to the rotor rotation can be determined arbitrarily by selecting a preferable screw pitch of the screw mechanism or by changing the shape of the leading end of the valve member opposing the valve seat.

Therefore, the present invention can provide a motor operated valve having valve performances that satisfies the demands of the users.

What is claimed is:

1. A motor operated valve with a reduction gear comprising:
   a valve body having a valve chamber and a valve seat;
   a valve member disposed in the valve chamber and movable on a longitudinal axis to open and close an opening of the valve seat;
   a valve shaft for operating the valve member;
   a cylindrical can fixed to the valve body and defining therewith an enclosed space centered on said axis;
   a motor exciter comprising a stationary stator coil mounted on an outer circumference portion of the can and centered about said axis;
   a permanent magnet rotor rotatably supported at an inner circumference portion of the can and driven to rotate by the exciter;
   a reduction gear for reducing the rotation of the rotor; and
   a screw mechanism for moving the valve member toward and away from the valve seat via the reduction gear by the rotary movement of the rotor, and
   the reduction gear and the rotor being disposed together in said enclosed space and being centered on and rotatable about said axis to form a compact coaxial motor operated valve with gear reduction.

2. The motor operated valve according to claim 1, wherein the reduction gear is disposed inside the rotor.

3. The motor operated valve according to claim 1, wherein the reduction gear is disposed under the rotor.

4. The motor operated valve according to claim 1, wherein the reduction gear includes a planetary gear mechanism.

5. The motor operated valve according to claim 1, wherein the reduction gear is composed of a multistage train of gears.

6. The motor operated valve according to claim 1, wherein the valve chamber includes a bellows sealing a gap between the valve shaft and the valve body.

* * * * *